Feb. 9, 1926.

L. A. PAGE

FISHING REEL

Filed March 10, 1922

1,572,032

Inventor
Louis H. Page
By Howard E. Barlow
Attorney

Patented Feb. 9, 1926.

1,572,032

UNITED STATES PATENT OFFICE.

LOUIS A. PAGE, OF PROVIDENCE, RHODE ISLAND.

FISHING REEL.

Application filed March 10, 1922. Serial No. 542,531.

*To all whom it may concern:*

Be it known that I, LOUIS A. PAGE, a citizen of the United States, residing at Providence, in the county of Providence and State of Rhode Island, have invented certain new and useful Improvements in Fishing Reels, of which the following is a specification.

This invention relates to certain improvements in the construction of line-reels adapted to be used more particularly for winding fishing lines; and the object of this invention is to provide a simple, practical and inexpensive construction of brake adapted to be operated by the thumb of the user, it being positioned for ready engagement by the thumb of the hand engaging the fish-rod adjacent the reel to regulate the speed of its rotation while the line is under tension.

With these and other objects in view, the invention consists of certain novel features of construction, as will be more fully described, and particularly pointed out in the appended claims.

Figure 1:
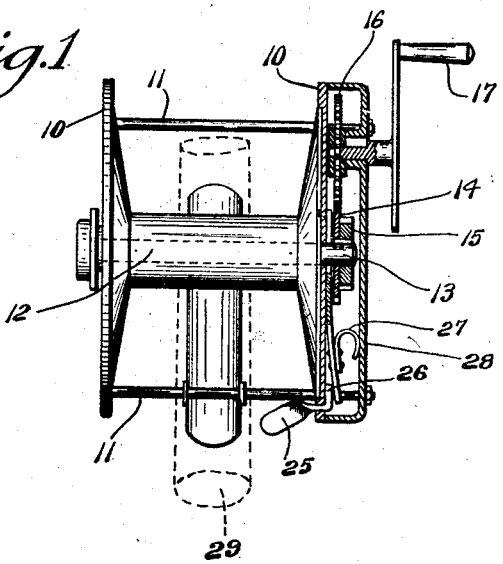
Figure 1 is a side elevation partly in section illustrating my improved construction of brake-device as applied to a fishing reel.
Figure 2:
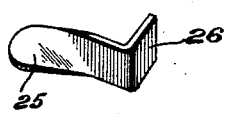
Figure 2 is a perspective view showing a detail of the brake-operating lever.
Figure 3:
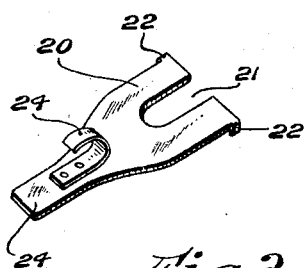
Figure 3 is a perspective view showing a detail of the friction-applying arm.
Figure 4:
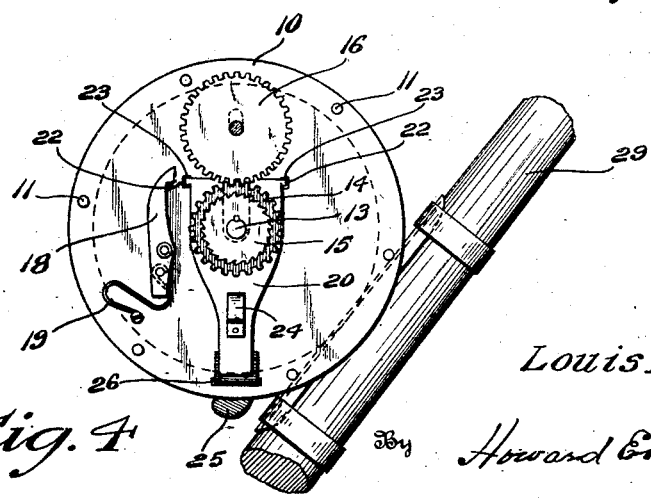
Figure 4 is a face view of the end of the reel with the cap or cover removed, showing my improved friction device as applied to a reel.

It is found in practice to be of advantage to provide a hand-operated brake attachment for a reel to nicely control the letting off of the line when playing the fish, and to position a brake-operating thumb-piece in position to be readily engaged by the thumb of that hand which engages the handle of the pole adjacent the reel, and the following is a detailed description of one means by which this result may be accomplished:—

With reference to the drawings, 10 designates the end plates which form the heads of a reel and which are fixed in spaced-apart relation by a cross-bar 11.

Between these head-plates is operatively mounted a winding spool 12, the same being fixed to a shaft 13 which preferably passes therethrough and receives its bearing in the head plates 10.

At one end of the reel on the outside of the plate 10 and on the end of shaft 13 is a driving pinion 14 and also the ratchet wheel 15 both of which are keyed and fixed securely to the end of this shaft.

This pinion 14 may be engaged by the large driving gear 16 which is operated through the winding handle 17 and may be moved either into or out of engagement with the pinion as desired. The ratchet gear 15 is adapted to be engaged by a pawl 18 which may be held either in or out of engagement with the ratchet gear as desired, by spring 19.

In order to provide a simple and effective way of applying a friction brake to the rotation of the spool I have formed a broad-faced arm 20 which is bifurcated at 21 to straddle the shaft 13 beneath the gear 14. The bifurcated ends of this arm are provided with inwardly-extending positioning fingers 22 which engage corresponding openings 23 in the head-plate 10, the free end 24 of this arm extending out near the periphery of its head-plate.

In order to lift this friction arm into frictional engagement with the under side of the gear 14 I have provided a thumb lever 25 which extends through an opening 26 in the head plate and has an inwardly-extending portion turned at substantially a right angle to the outer operating end portion thereof, which angled portion extends beneath the free end of the friction arm as illustrated in Figure 1, whereby an inward pressure on the end of this lever 25 raises the engaging end of this arm into frictional engagement with the inner surface of the gear 14 and a spring 27 is fixed to the arm 20 to engage the inner surface of the cover plate 28 whereby when lifted by the operating lever the friction arm and the lever are returned to and are normally held in disengaged position.

The reel is adapted to be mounted by any suitable means on the usual fishing pole 29 and this brake is so positioned as to be readily engaged by that hand of the fisherman, which engages the pole adjacent the reel.

The device is extremely simple and inexpensive in construction and practical in its operation and by its use the brake on the reel may be readily applied and the rotation of the reel nicely controlled.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A fishing reel comprising fixed head plates, a rotatably mounted shaft extending through one of said plates, a driving gear having a friction surface in a plane substantially parallel to said plate and fixed to said shaft on the outside of the head plates, a friction arm for engaging said surface, a thumb lever for moving said arm into engagement with said friction surface, and a spring for returning said arm to and normally holding it in inoperative position.

2. A fishing reel comprising a pair of fixed head plates, a spool rotatably mounted between said plates and provided with a shaft bearing in said plates, a spool-driving pinion fixed to said shaft, a friction arm having one end extending beneath said pinion and its free end adjacent the periphery of said plate, a thumb-lever mounted to swing in said plate with its inner end engaging said free end of said arm to lift the same into frictional engagement with the under side of said gear, and a spring for normally holding said arm and lever in inoperative position.

In testimony whereof I affix my signature.

LOUIS A. PAGE.